3,146,219
CATALYST COMPOSITION AND METHOD OF
USING SAME
Burton D. Beitchman, Springfield Township, Delaware
County, Pa., assignor to Air Products and Chemicals,
Inc., Philadelphia, Pa., a corporation of Delaware
No Drawing. Filed Apr. 20, 1962, Ser. No. 188,958
1 Claim. (Cl. 260—75)

This invention relates to catalyst compositions and methods for using the same and is particularly concerned with methods for the catalysis of the chemical reactions increasing molecular weight (conveniently designated as polymerization) of organic compositions. The utility of the polymerization catalyst has been proven in the preparation of polyurethane compositions from mixtures containing reactive hydrogen and isocyanato groups.

The isocyanato compounds can be polymerized, isocyanurate groups being formed in the presence of what are conveniently designated as trimerization catalysts. The isocyanato groups react with active hydrogen in compounds such as alcohols, phenols, primary amines, secondary amines, ureas, amides, carboxylic acids and the like. A variety of substances sometimes conveniently designated as polyurethane compositions, have been prepared by interaction of materials containing a plurality of reactive hydrogen atoms per molecule and materials containing a plurality of isocyanato groups per molecule. Catalyst compositions containing components such as organic compounds of tin, tertiary amines, and epoxy alkanes, have been used as polymerization catalysts for preparing such polyurethane compositions and/or polymers of organic diisocyanates.

The order of effectiveness among polymerization catalysts is generally different for the polyurethane reaction and trimerization reaction, but many catalysts have measurable activity for both reactions. Prior literature has explained how to determine the relative order of catalytic effectiveness for a series of catalysts for isolated systems, such as the reaction between an aliphatic alcohol and phenyl isocyanate or the polymerization of phenyl isocyanate to the trimeric form as an isocyanurate. For example, an article by J. W. Britain et al. in J. Appl. Polymer Sci., vol. 4, 207 (September 1960), explains in Table XI that an organic tin salt such as stannous octoate exhibits relatively greater activity than triethylamine (the preferred urethane catalyst for many years), for the reaction of the alcoholic hydroxyl groups of Niax Triol LG 56 with isocyanato groups. Burkus, 2,979,485, discloses that the combination of triethylamine and a $C_2$ or $C_3$ epoxy alkane (i.e., ethyleneoxide or epoxy propane) is particularly effective for the trimerization of phenyl isocyanate and/or the polymerization of tolylene diisocyanate. Attempts have been made to extrapolate from the results observed in connection with the relative reaction rates of isolated catalyzed systems and the catalysis of the polymerization of an organic composition under conditions encountered in the manufacture of plastic articles. For example, in tests concerned merely with isolated systems, the combination of epoxy alkane and 1,4-diazabicyclooctane was found to be highly effective for the trimerization reaction but not outstandingly superior to 1,4-diazabicyclooctane alone for the urethane reaction. However, in the production of plastics, an important use for this highly advantageous co-catalyst was for the preparation of polyurethane elastomers from an approximately equimolar mixture of polypropyleneetherglycols and tolylene diisocyanate. Although there appears to be some correlation between the catalytic effectiveness of catalysts in the isolated systems and in the polymerization in plastics factories, a portion of the results differ significantly from what might have been predicted on the basis of the data from the isolated systems. Accordingly, the catalytic polymerization of mixtures for the production of polyurethane type of compositions must be treated as an empirical art.

In accordance with the present invention, there is provided a catalyst composition consisting of a mixture of a triethylenediamine type of compound and a three-membered aza ring conveniently designated as a lower secondary imine, that is an imine having fewer than 11 carbon atoms, or at least 2 but not more than 10 carbon atoms, and this catalyst composition is employed as a polymerization catalyst in systems containing a plurality of isocyanato groups and a plurality of reactive hydrogen atoms to produce compositions containing groups such as those in polyurethanes, polyisocyanates, polyisocyanurates and the like. The molar concentration of the secondary imine must be within the range from 2% to 98%, and the molar concentration of the triethylenediamine type of compound must be from 2 to 98%.

The method of the present invention consists of bringing about the polymerization of an organic mixture characterized by both a plurality of reactive hydrogen atoms and a plurality of isocyanato groups, under the catalytic influence of a co-catalyst consisting of a mixture of triethylenediamine type of compound and a secondary imine having fewer than 11 carbon atoms.

The secondary imines may be described as organic three-membered aza ring compounds having the generic formula:

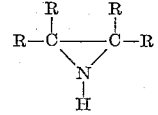

in which each R is selected from the group consisting of H and $C_1$ to $C_7$ hydrocarbon groups so that the total number of carbon atoms in the compound is less than 11, that is at least 2 but not more than 10 carbon atoms.

The nature of the present invention is further clarified by reference to several examples.

EXAMPLES 1–12

In a series of preparations of polyurethane compositions, certain features were uniform, including the use of: polypropylene glycol of about 425 molecular weight as the polyol; tolylene diisocyanate (e.g., Hylene TM brand) as the polyisocyanate; a ratio of about 1.22 to 1 for the NCO/OH ratio by reacting 50 g. of TDI per 100 g. of PPG–425; triethylenediamine (e.g., DABCO brand of 1,4-diazabicyclo-2,2,2-octane, conveniently designated as $C_6H_{12}N_2$ or TED) as the tertiary amine; and curing the composition at about 105° C. In a control test, using 0.1 g. of triethylenediamine catalyst; flash evaporating for one minute to remove dissolved air, etc., and curing for one hour, a syrup was produced. After standing overnight at room temperature the syrup was transformed into a very soft, tacky gel. However, by the use of 0.1 g. of ethylene imine in each of this series of examples, useful solids were obtained. Data relating to the preparations are shown in Table I.

Table I

| Example | TED, g. | C₂H₅N, g. | Hrs. Cure | Plasticizer | G. | Properties ||||
|---|---|---|---|---|---|---|---|---|---|
| | | | | | | Tens, lb./in.² | Shore hard. | Percent elon. | Tear, lb./in.² |
| 1 | 0.1 | 0.1 | 1 | None | | 2,432 | 58D | 190 | nd |
| 2 | 0.1 | 0.1 | 0.5 | ___do___ | | nd | nd | nd | ¹nd |
| 3 | 0.2 | 0.1 | 0.5 | ___do___ | | nd | nd | nd | ¹nd |
| 4 | 0.08 | 0.1 | 4 | Flexol TDF | 10 | 1,250 | 79A | 231 | 87 |
| 5 | 0.08 | 0.1 | 4 | ___do___ | 20 | 845 | 59A | 244 | 50 |
| 6 | 0.08 | 0.1 | 4 | ___do___ | 40 | 391 | 49A | 171 | 23 |
| 7 | 0.08 | 0.1 | 4 | Flexol 3GO | 10 | 888 | 73A | 210 | 73 |
| 8 | 0.08 | 0.1 | 4 | ___do___ | 20 | 542 | 60A | 163 | 45 |
| 9 | 0.08 | 0.1 | 4 | ___do___ | 40 | 258 | 49A | 134 | 22 |
| 10 | 0.08 | 0.1 | 4 | Celluflex CEF | 10 | 345 | 79A | 112 | 81 |
| 11 | 0.08 | 0.1 | 4 | ___do___ | 20 | 380 | 63A | 116 | 44 |
| 12 | 0.08 | 0.1 | 4 | ___do___ | 40 | 258 | 53A | 78 | 19 |

Note.—nd=no data available.
¹ Solid.

In order to minimize bubble formation, water and air were removed from the polyol components by an evacuation treatment at mildly elevated temperature for about one half to several hours. A degassing environment without added heat was employed in several instances with the reaction mixture. The data indicate that the combination of triethylene diamine and ethylene imine provide such effective catalysis of the reaction that a variety of useful products may be prepared by control of the composition of the reaction mixture and/or curing time.

EXAMPLE 13

Polypropylene glycol (425 molecular weight, corresponding approximately to a mixture of hexamer, heptamer and octamer containing predominantly heptamer) was heated to about 100° C., and a measured amount of triethylene diamine was added to prepare a solution containing 830 p.p.m. of the principal catalyst. After the solution had cooled to room temperature, the accelerating catalytic component, ethylene imine, was added to provide 83 p.p.m. of ethylene imine (0.1 ml.). The diisocyanate (71.9 g. of Nacconate 300 brand of 4,4-diisocyanato diphenyl methane, providing a ratio of NCO/OH of about 1.48) was mixed into the polypropylene glycol and the mixture subjected to vacuum for 2 minutes to remove entrained gases. The thus prepared reaction mixture was poured into a hot (105° C.) mold and cured for 3 hours at 105° C. to provide an elastomer having the following properties:

| | |
|---|---|
| Tensile strength_____p.s.i. | 6719 |
| Shore hardness_____ | 76D |
| Percent elongation_____percent | 27 |
| Tear strength_____p.s.i. | 801 |
| Abrasion resistance_____ | 15.0×10⁻⁵ |

Such properties in a cast elastomer without any mechanical working of the composition and at a curing temperature as low as 105° C. is indicative of superior effectiveness of the catalyst system.

EXAMPLE 14

A rigid polyurethane foam was prepared using the volatilization of trichlorofluoromethane (B.P. 24.1° C.) to expand the foam. The polyol was a reaction product of propylene oxide and sorbitol, there being several polypropyleneetherglycol units attached to the sorbitol nucleus, and had a hydroxyl number of about 490 and an average molecular weight of about 760. A polyol marketed as Atlas G-2410 has such properties. The foam forming composition consisted of catalyst plus:

| | G. |
|---|---|
| Polyol | 188 |
| Water soluble silicone oil | 2 |
| Tolylene diisocyanate | 152.8 |
| Trichlorofluoromethane | 56 |

The reaction mixture was stirred for 15 seconds, and poured into a 15 x 20 x 30 cm. box. The effectiveness of ethylene imine in promoting the catalytic action of triethylene diamine in a standard and substandard concentration was noted.

| | Control | B | C |
|---|---|---|---|
| Catalyst concn. in p.p.m. of polyol: | | | |
| Ethylene imine | | 88 | 88 |
| Triethylenediamine | 645 | 645 | 450 |
| Mols TED/EI | Infinite | 3.16 | 2.2 |
| Properties of rigid foam: | | | |
| Density, #/ft.³ | 1.75 | 1.727 | 1.787 |
| Tensile, p.s.i. | 31.8 | 31.5 | 31.0 |
| Compressive, p.s.i. | 18.2 | 24.8 | 29.7 |
| Thermal conductivity | 0.191 | 0.195 | 0.185 |
| Distortion temperature, °F. | 282 | 280 | 290 |

Inasmuch as the rigid foams resulting from the use of the co-catalysts characterized by ethylene imine were superior in compressive strength, the merit of using ethylene imine was established.

EXAMPLES 15–18

The building construction industry has long recognized that it would be attractive to employ as a caulking material a composition which would have a relatively low viscosity when applied to a joint, which would quickly develop an increased viscosity to become an elastomeric caulking compound, and which would have excellent aging characteristics. Polyurethane elastomers containing inorganic fillers provide one of the most hopeful answers to such long sought caulking compounds. However, difficulty has been experienced in catalyzing the polyurethane formation at room temperature. The combination of triethylenediamine and ethylene imine is quite effective in the room temperature polymerization of caulking compositions.

In the preparation of caulking compounds polybutyleneetherglycol having a molecular weight of 1500 proves to be advantageous in combination with polypropylene glycol having a molecular weight of about 425, one of the useful mixtures consisting of 0.075 equivalent of the B-1500 polyol and 0.118 equivalent of PPG-425. Another useful mixture consisted of 0.0375 equivalent weights of B-2000, a polybutyleneether glycol having a molecular weight of about 2000, and 0.294 equivalent of PPG-425.

In several caulking compound preparations, the inorganic filler was included in the formulation in an amount equivalent by weight to the weight of the polyol. Among the inorganic fillers tested were silica powder designated as 120 mesh, silica powder designated as 200 mesh, talc, and South Carolina kaolin. Data relating to the several caulking compounds are set forth in Table II.

Table II

| Example | Polyol | Equiv. | Filler | TDI equiv. | NCO/OH ratio | Catalyst | PHR | Tens. str. (p.s.i.) | Shore hard. | Percent elong. at break | Tear str. (lb./in.) |
|---|---|---|---|---|---|---|---|---|---|---|---|
| 15 | B-1500 / PPG-425 | 0.075 / 0.118 | Silica cryst. (120 mesh) | 0.467 | 2.42 | TED / EI | 0.85 / 0.25 | 1,965 | 95A | 34 | 192 |
| 16 | B-2000 / PPG-425 | 0.0375 / 0.294 | Silica cryst. (200 mesh) | 0.467 | 1.41 | TED / EI | 1.20 / 0.199 | 1,301 | 93A | 100 | 175 |
| 17 | PPG-425 | 0.472 | Talc | 0.472 | 1.0 | TED / EI | 1.0 / 0.50 | 520 | 79A | 233 | 99 |
| 18 | PPG-425 | 0.94 | So. Carolina Kaolin, 200 g.=wt. of polyol. | 0.94 | 1.0 | TED / EI | 2.0 / 1.0 | 1,266 | 90A | 262 | 245 |

The physical properties of the caulking compounds of Examples 15–18 are advantageous for a caulking compound having significantly greater strength and viscosity a few days after installation than at the time when applied to a crevice.

EXAMPLE 19

In a series of preparations of useful polyurethane compositions by the polymerization of a substance containing a plurality of isocyanato groups and a substance containing a plurality of reactive hydrogens, it was established that the catalyst combination of a triethylenediamine type of compound with a lower secondary imine was advantageous. Catalyst compositions of the tertiary amine plus the lower secondary imine with metallo organic compounds, such as tin, are likewise advantageous. Among the aromatic diisocyanates useful in the practice of the present invention are paraphenylene diisocyanate, 4,4'-bibenzyl diisocyanate, tetrachloro-paraphenylene diisocyanate, tetra-chloro-meta-phenylene diisocyanate, dianisidine diisocyanate, benzidine diisocyanate, naphthalene diisocyanate, meta-phenylene diisocyanate, the tolylene diisocyanates, bitolylene diisocyanate, dimers of such diisocyanates and the like. Among the substances containing a plurality of active hydrogens are polyether polyols such as the polypropylenepolybutylene- and polytetramethylene ether; polyesters such as the hydroxyl terminated polyethylene glycol adipate esters polytetramethylene glycol adipate esters, and polypentamethylene glycol adipate esters. Other substances of value include methylene bis-o-chloroaniline; sorbitol; benzidine; 1,4-butanediol; 1,1,1-trimethylolpropane and similar materials.

Such building units for polyurethane compositions are merely illustrative, inasmuch as the present invention is concerned primarily with the catalyst system for polyurethane compositions and the catalyst system has been shown to be useful in the preparation of a wide variety of polyurethane compositions.

EXAMPLES 20–24

In a series of preparations of polyurethane compositions, certain features were uniform including the use of: polypropylene glycol, a polyol polyether of about 425 molecular weight; polybutylene ether glycol, a polyether diol of about 1500 molecular weight; and tolylene diisocyanate as the polyisocyanate. The catalyst compositions were composed of triethylenediamine as the tertiary amine, ethylene imine as the lower secondary imine, and stannous octoate as a supplemental catalyst component. Data relating to the preparations are shown in Table III.

In addition to the properties shown in Table III, these compositions were tested as potting materials and were found to have excellent dielectric characteristics and power factors as well as desirable physical characteristics, thus making them particularly adaptable to use in fabrication of certain electrical components.

The secondary imines of the present invention can be represented by the formula:

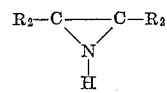

in which each of the 2 R's is selected from the group consisting of hydrogen and lower alkyl and in which the total number of carbon atoms in the imine is less than 11 carbon atoms. Among the useful lower secondary imines are ethylene imine, propylene imine, 2-ethyl ethylene imine, 2,3-dimethyl ethylene imine, 2-benzyl ethylene imine, 2-benzyl-3-methyl ethylene imine and similar compounds.

The useful triethylenediamine type of compounds include triethylenediamine, and the derivatives with methyl groups attached to 1 or 2 carbon atoms, and corresponding to the formula:

$$N(CHRCHR)_3N$$

in which at least 4 of the 6 R's are hydrogen and in which each of the 2 remaining R's is selected from the group consisting of hydrogen and methyl. The formula embraces triethylenediamine, 2 - methyltriethylenediamine, 2,3 - dimethyltriethylenediamine, 2,5-dimethyltriethylenediamine and 2,6-dimethyltriethylenediamine, the five species of triethylenediamine type of compound.

Obviously many modifications and variations of the invention as hereinbefore set forth may be made without departing from the spirit and scope thereof, and therefore only such limitations should be imposed as are indicated in the appended claim.

What is claimed is:

In the method in which a polyurethane material is prepared by the reaction of an organic composition characterized by a plurality of isocyanato groups with a polyol composition selected from the group consisting of polyesters, polyethers and mixtures thereof in the presence of a catalyst amount of a catalyst composition the improvement which consists of employing as the catalyst for such polymerization the catalyst composition consisting essentially of a mixture of a compound selected from the group consisting of triethylenediamine, 2 methyl tri- Table III

| Example | TED, g. | $C_2H_5N$, ml. | Tin octoate, g. | PPG 425, g. | PBEG 1500, g. | TDI, g. | Minutes cure at 105° C. | Properties | | |
|---|---|---|---|---|---|---|---|---|---|---|
| | | | | | | | | Tens., lb./in.² | Shore hard. "D" | Percent Elong. |
| 20 | 0.25 | 0.12 | 0.027 | 62.3 | 28.2 | 60.9 | 30 | 4,651 | 74 | 21 |
| 21 | 0.83 | 0.24 | 0.025 | 62.4 | 28.2 | 60.9 | 30 | 4,289 | 75 | 35 |
| 22 | 0.27 | 0.12 | 0.030 | 62.4 | 28.2 | 60.9 | 30 | 2,944 | 69 | 51 |
| 23 | 0.27 | 0.12 | 0.030 | 62.4 | 28.2 | 60.9 | 240 | 4,198 | 75 | 25 |
| 24 | 0.27 | 0.12 | 0.030 | 62.4 | 28.2 | 60.9 | 480 | 4,294 | 74 | 38 | ethylenediamine, 2,6-dimethyltriethylenediamine, 2,5-dimethyltriethylenediamine, and 2,3-dimethyltriethylenediamine, and a lower alkylene imine having from 2 to 10 carbon atoms and corresponding to the formula:

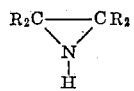

in which each of the R's is selected from the group consisting of hydrogen and lower alkyl.

References Cited in the file of this patent

UNITED STATES PATENTS

| | | |
|---|---|---|
| 2,939,851 | Orchin | June 7, 1960 |
| 3,042,632 | Erner | July 3, 1962 |
| 3,054,757 | Britain | Sept. 18, 1962 |